United States Patent
Tsuchida

(10) Patent No.: US 7,070,224 B2
(45) Date of Patent: Jul. 4, 2006

(54) SEALING STRUCTURE FOR CONVERTIBLE TYPE VEHICLE

(75) Inventor: Hideshi Tsuchida, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 10/962,870

(22) Filed: Oct. 7, 2004

(65) Prior Publication Data

US 2005/0127707 A1 Jun. 16, 2005

(30) Foreign Application Priority Data

Dec. 11, 2003 (JP) ............................. 2003-413345

(51) Int. Cl.
*B60J 7/00* (2006.01)

(52) U.S. Cl. .................................. 296/135; 296/107.04

(58) Field of Classification Search ........... 296/107.04, 296/121, 216.06, 135, 107.07
See application file for complete search history.

(56) References Cited

U.S. PATENT DOCUMENTS

| 4,729,593 | A | * | 3/1988 | Nisiguchi et al. ........... 296/154 |
| 5,851,048 | A | * | 12/1998 | Fujita et al. ........... 296/107.04 |
| 6,030,022 | A | * | 2/2000 | Bormann et al. ...... 296/107.04 |
| 6,189,950 | B1 | * | 2/2001 | Kawazoe et al. ...... 296/107.04 |

* cited by examiner

*Primary Examiner*—Dennis H. Pedder
(74) *Attorney, Agent, or Firm*—Frishauf, Holtz, Goodman & Chick, P.C.

(57) ABSTRACT

There is provided a sealing structure in a convertible type vehicle in which a roof 11 is opened by folding or removing the roof 11, wherein a weather strip 15 mounted to a header 12 comprises seal portions 18, 19, which seals a gap by making a resilient contact with the hood 11 when the hood 11 is in a closed position. A roof side weather strip 22 mounted to a side edge of the hood 11 comprises a sub-seal portion 28 which seals a gap formed with the hood 11. A fin shape seal portion 1 is projecting formed at a front end of the sub-seal portion 28, where a front end of the seal portion 1 makes a resilient contact with a seal portion 19 of the weather strip 15 when the hood 11 is in a closed position, thereby sealing a contacting portion formed between the weather strip 15 and the front end of the roof side weather strip 22.

2 Claims, 6 Drawing Sheets

SEALING STRUCTURE FOR CONVERTIBLE TYPE VEHICLE

BACKGROUND OF THE INVENTION

This invention relates to a sealing structure formed at a portion where a weather strip mounted along a header and a front pillar of a vehicle makes a contact with a front end of a roof side weather strip in a convertible type vehicle comprising a roof which opens by being folded or removed.

FIG. 9 illustrates a convertible type vehicle comprising a foldable hood 11 which forms a roof, wherein the hood 11 is stored at a backside of a vehicle body when it is folded to open the roof, while a front end of the hood 11 makes a contact with a header 12 and a top end of a front pillar 13 when it is in a closed position.

FIG. 10 illustrates a view of a portion positioned along a header 12 in a weather strip 15 which is mounted to a header which extends sideward from a top end of a front pillar 13 and a front pillar 13. The header 12 secures a top end of a front glass 14. The weather strip 15 comprises a mounting base portion 17 being mounted to a retainer 16 and two hollow seal portions 18, 19, wherein a hood 11 makes a contact with the hollow seals 18, 19 when the hood 11 is in a closed position, thereby sealing a gap between a top end of the hood 11 and the header 12.

FIG. 11 illustrates a roof side weather strip 22 which is mounted to a side edge of the hood 11 with a retainer 21. The roof side weather strip 22 comprises a mounting base portion 25 which is mounted to the retainer 21 fixed to a link 23 by a screw 24; a hollow seal portion 27 which is integrally formed with the mounting base portion 25, and makes a resilient contact with a top end of a side glass 26 after the side glass 26 moves upward to close; a hollow sub-seal portion 28 which makes a resilient contact with a hood 11 to prevent water from invading into an interior side of a vehicle by passing through a gap between the hood 11 and the hollow seal portion 27 in a direction shown by an arrow in the drawing while washing the vehicle with high pressure water.

As illustrated in FIG. 12, the roof side weather strip 22 is designed such that a front end thereof makes a resilient contact with a corner portion of the weather strip 15 which is mounted along the header 12 and the front pillar 13, and the sub-seal 28 is generally cut off at its front end. If the front end of the sub-seal 28 is left uncut, in case there is an inaccuracy in fitting operation of the roof side weather strip 22, a front end of the sub-seal portion 28 would impinge against the hollow seal portion 19 of the weather strip 15 at a time the hood 11 is in a closed position, thereby deforming the hollow seal portion 19 and impairing a sealing function between the hollow seal portion 19 and a front end of the hood 11. In the corresponding drawing, a portion shown with the black in the triangle indicates a die molded portion, while the white indicates an extrusion molded portion. Similar indication is applied in other drawings.

On the other hand, the cutting of the sub-seal portion described above induces a problem, that is, as illustrated in FIG. 12, the water invading in the direction shown by an arrow in FIG. 11 invades into an interior side of the vehicle through the cut off portion 29 of the sub-seal portion 28. Conventionally, there was a method to prevent such problem wherein a highly foamed sponge, e.g., EPT sealer is provided to the roof side weather strip 22, thereby making the EPT sealer elastically contact to the hood 11 to seal the cut off portion 29. There was also another method wherein a hole or holes for draining water is/are formed in the roof side weather strip 22 at a portion closer to the cut off portion 29 in order to drain the water invaded from the direction shown by an arrow in FIGS. 11 and 12 through the roof side whether strip 22 via the hole or holes. However, the former method using the EPT sealer induces an increase of a production cost, whereas the latter method forming the hole or holes in the roof side weather strip 22 has a difficulty in draining the water invading from the direction shown with the arrow in FIGS. 11 and 12 when a quantity of the invading water is large at a time of a car wash with highly pressured water.

It is therefore an object of this invention to provide a sealing structure formed at a contacting portion between a weather strip and a front end of a roof side weather strip wherein a hollow seal portion of the weather strip, which is mounted along a header and a front pillar of a vehicle, does not deform by being pushed by a front end of a roof side weather strip when a roof is in a closed position in a convertible type of vehicle in which the roof is folded or removed to open.

SUMMARY OF THE INVENTION

There is provided a sealing structure formed between a weather strip and a roof side weather strip in a vehicle comprising a roof which opens by being folded or removed. The weather strip is mounted to a header which extends sideward from a top end of the front pillar and secures a top end of a front glass, and a front pillar. The weather strip comprises seal portions to seal a gap formed between a front ends of a roof by making a resilient contact with the front end of the roof when the roof is in a closed position. The roof side weather strip comprises a sub-seal portion to seal a gap formed between the roof by resiliently contacting a side portion of the roof. The sub-seal portion is provided with a fin shape seal portion at a front end thereof. The fin shape seal portion bends or curbs in an interior side of the vehicle after making a contact with a side portion of the roof. The fin shape seal portion makes a resilient contact with the weather strip when the roof is in a closed position.

According to the invention, the fin shape seal portion seals a gap formed between the roofs like the sub-seal portion. The fin shape seal portion is smaller in rigidity compared to a hollow seal portion and is curved, so that it is easily bent when it impinges to the hollow seal portion of the weather strip when the roof is in a closed position. Further, since the contact area of the fin shape seal portion against the hollow seal portion of the weather strip is larger, the stress applied to the hollow seal portion is dispersed. Those facts enable to make the hollow seal portion of the weather strip hardly deform, thereby making the hollow seal portion not to impair its sealing performance against the hood of the vehicle.

Other features and effects of the present invention will be more clearly understood in the following detailed description of the embodiments by those skilled in the art. It must be, however, noted that the technical scope of the present invention is not limited to the embodiments and the accompanying drawings alone.

DESCRIPTION OF THE PREFERRED EMBODIMENT

Figure 1:
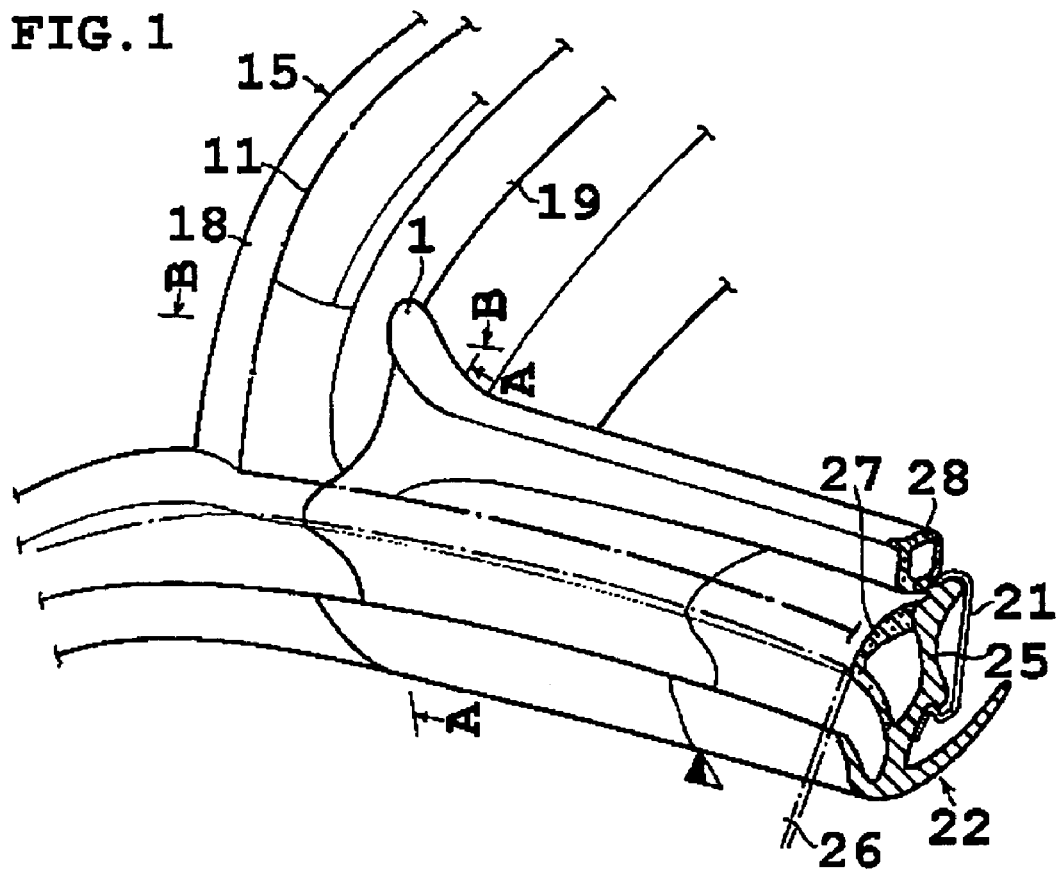
FIG. 1 is a perspective view showing a primary section of a sealing structure according to the invention.

A sealing structure according to a preferred embodiment of the invention will be described hereinafter referring to FIGS. 1 to 8. In the drawings, same numerals are applied to portions which correspond to similar portions in the conventional sealing structure illustrated in FIGS. 9 to 12.

Figure 2:
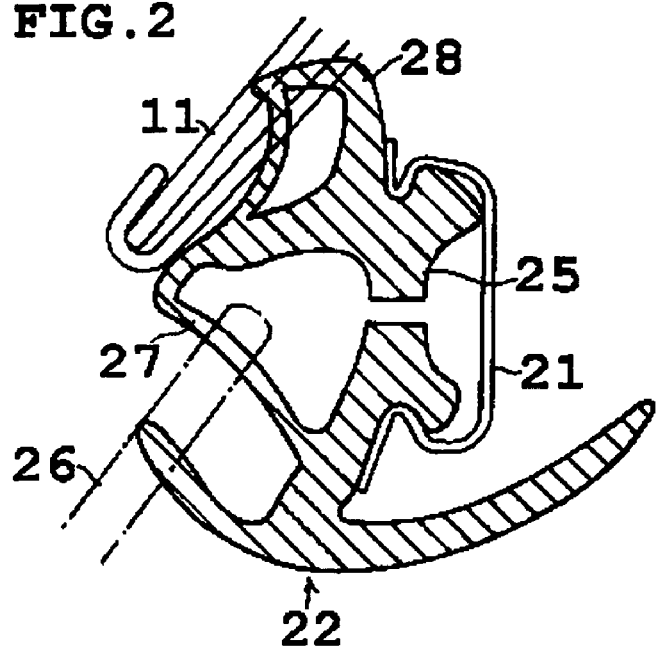
FIG. 2 is a sectional view along line A—A in FIG. 1.
Figure 3:
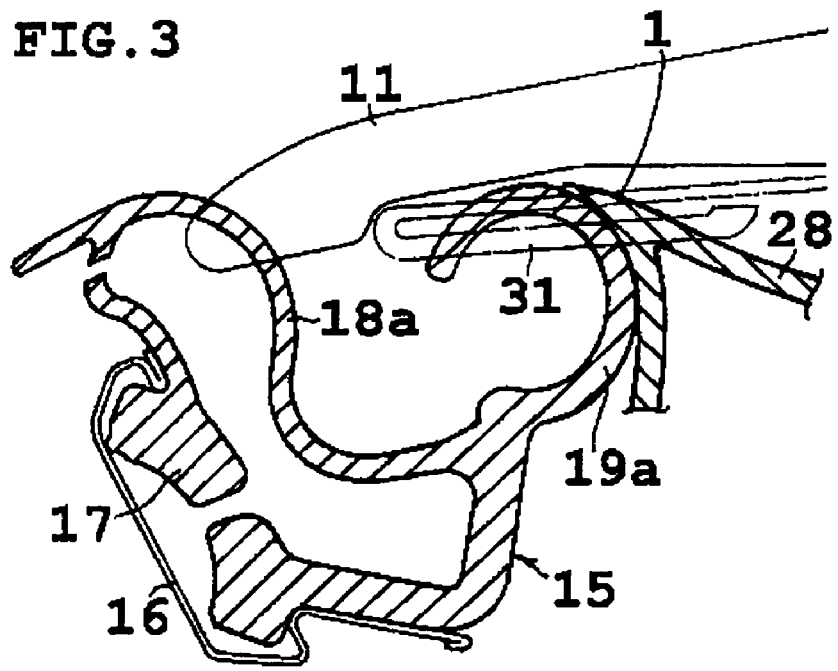
FIG. 3 is a sectional view along line B—B in FIG. 1 and FIG. 7.

FIGS. 1 to 3 illustrate a sealing structure according to a first preferred embodiment of the invention wherein FIG. 1 shows a structure in which, when a hood 11 forming a roof is in a closed position, a die molded front end of a roof side weather strip 22 mounted along a side edge of a hood 11 is making a contact with a die molded corner portion of a weather strip 15 which is mounted along a header 12 which extends sideward from a top of end of the front pillar 13 and secures a top end of a front glass 14, and a front pillar 13. FIG. 2 is a sectional view along A—A line in FIG. 1, and FIG. 3 is a sectional view along line B—B in FIG. 1.

Figure 10:
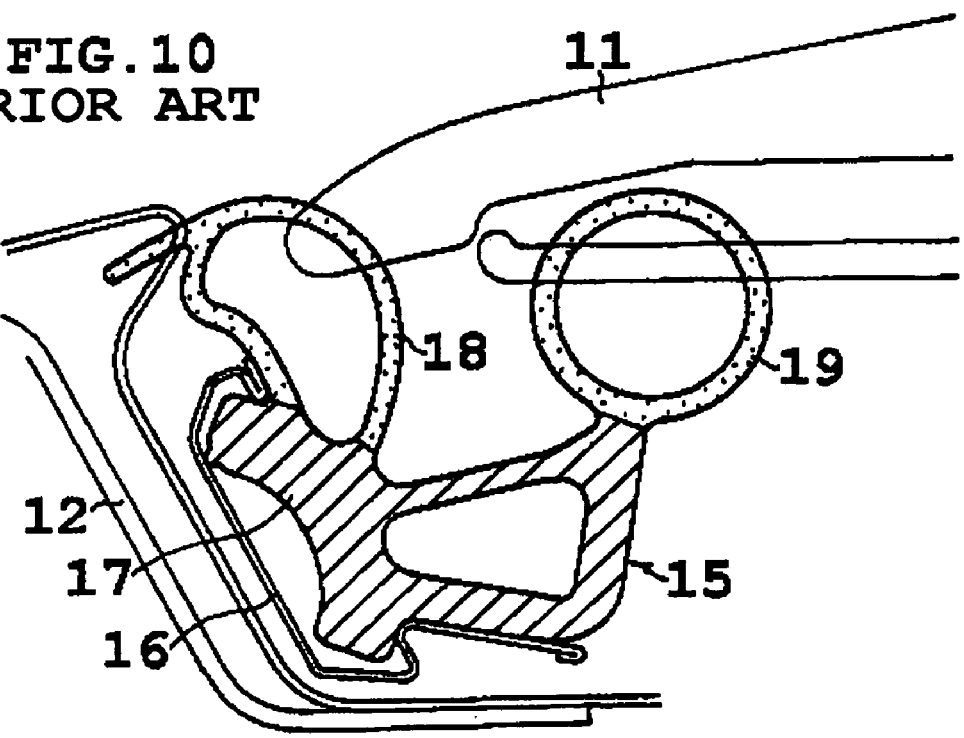
FIG. 10 is a sectional view showing a weather strip mounted to a header according to the prior art.
Figure 11:
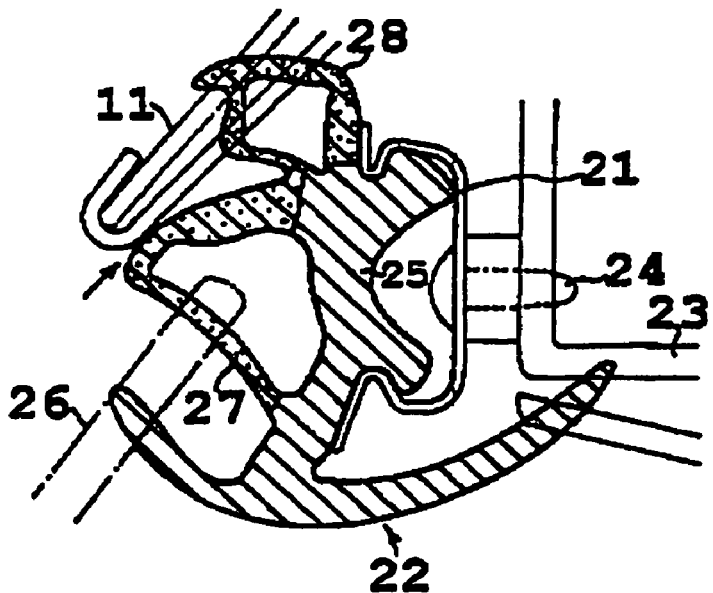
FIG. 11 is a sectional view showing a roof side weather strip mounted to a side of a hood according to the prior art.
Figure 12:
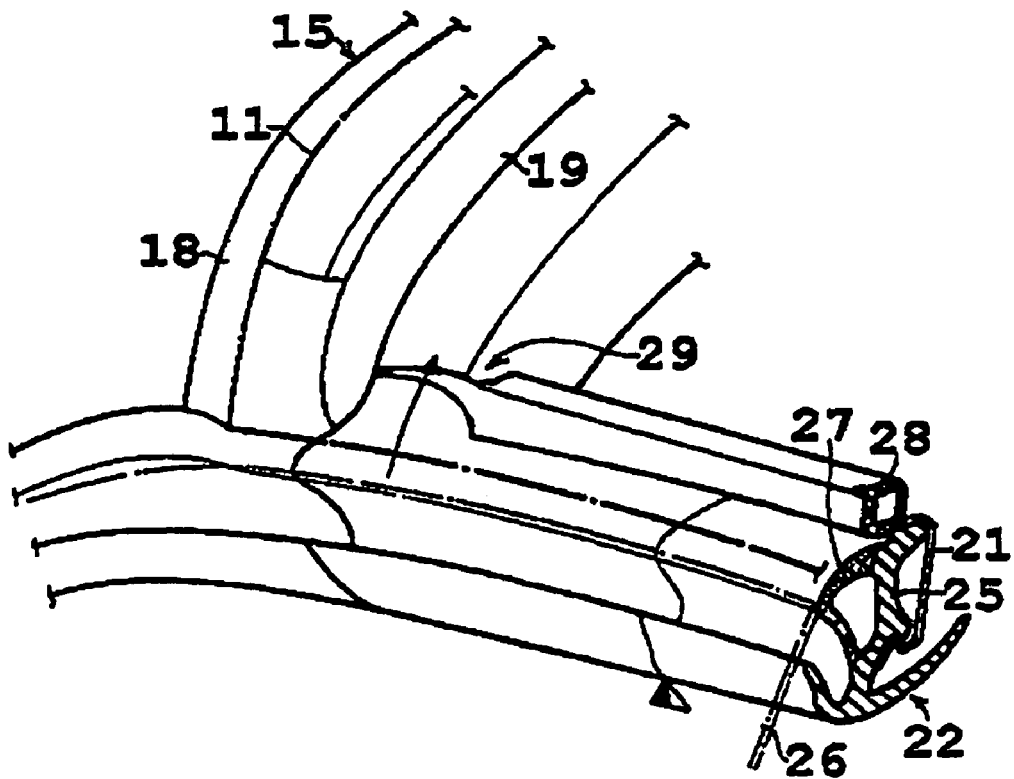
FIG. 12 is a perspective view showing a primary section of a conventional sealing structure according to the prior art.

Hollow sealing portions 18a and 19a connected to the hollow sealing portions 18 and 19 of the weather strip 15 shown in FIG. 10 are formed integrally with the mounting base portion 17, showing the die-molded portion of the weather strip 15, which are mounted to the retainer 16. When a hood 11 is closed, the hood 11 makes a resilient contact with the hollow seal portions 18, 18a, 19, 19a, thereby sealing a gap formed between a front end of the hood 11 and a header 12 (See FIG. 10). In the drawing, the numeral "31" indicates a garnish.

As illustrated in FIGS. 1 and 2, the roof side weather strip 22 comprises a mounting base portion 25, which is mounted to a retainer 21 mounted along a side edge of the hood 11, a hollow seal portion 27 formed integrally with the mounting base portion 25 and a hollow sub-seal portion 28. The hollow seal portion 27 makes a resilient contact with a top edge of a side glass 26 after the side glass 26 is closed, thereby sealing that portion. The sub-seal portion 28 makes a resilient contact with the hood 11, thereby sealing that portion.

Although the sealing structure described above is similar in general to the conventional sealing structure which is illustrated in FIGS. 9 to 12, it clearly differs from the conventional sealing in a point that the sealing structure described above comprises a fin shape seal portion 1 projecting from a front end of the sub-seal portion 28 of a die molded front end of the roof side weather strip 22, wherein a front edge portion of the bent shaped seal portion 1 curbs along the seal portion 19a of a corner of the weather strip 15 when the hood 11 is in a closed position, and the seal portion 1 makes a resilient contact with the hollow seal portion 19a.

According to the sealing structure of the preferred embodiment of the invention, the seal portion 1 is able to seal a gap between the hood 11 and the hollow seal portion 27 (see FIG. 2) to shut off the water invading through the gap otherwise. Further, when the hood 11 is in a closed position, the front edge of the seal portion 1 bends as it makes a resilient contact to the hollow seal portion 19a by bending along a shape of the hollow seal portion 19a. As the seal portion 1 bends along the seal portion 19a, the stress applied against the seal portion 19a by the seal portion 1 disperses, so that a deformation of the hollow seal portion 19a is minimized.

According to the above-mentioned embodiment, each of the seal portions 18, 19 of the weather strip 15 as well as the sub-seal portion 28 of the roof side weather strip 2 are formed in a hollow shape though, each of them may be formed in a lip shape.

Figure 4:
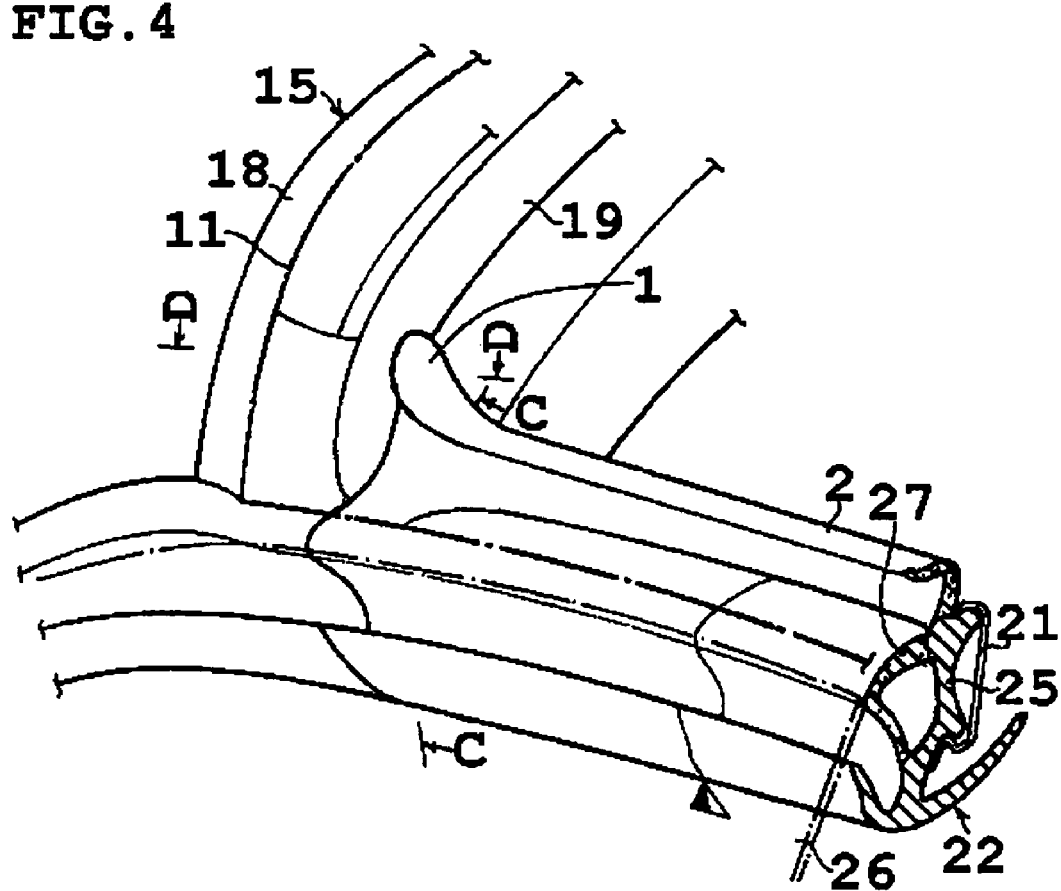
FIG. 4 is a perspective view showing a primary section of another embodiment of a sealing structure according to the invention.
Figure 5:
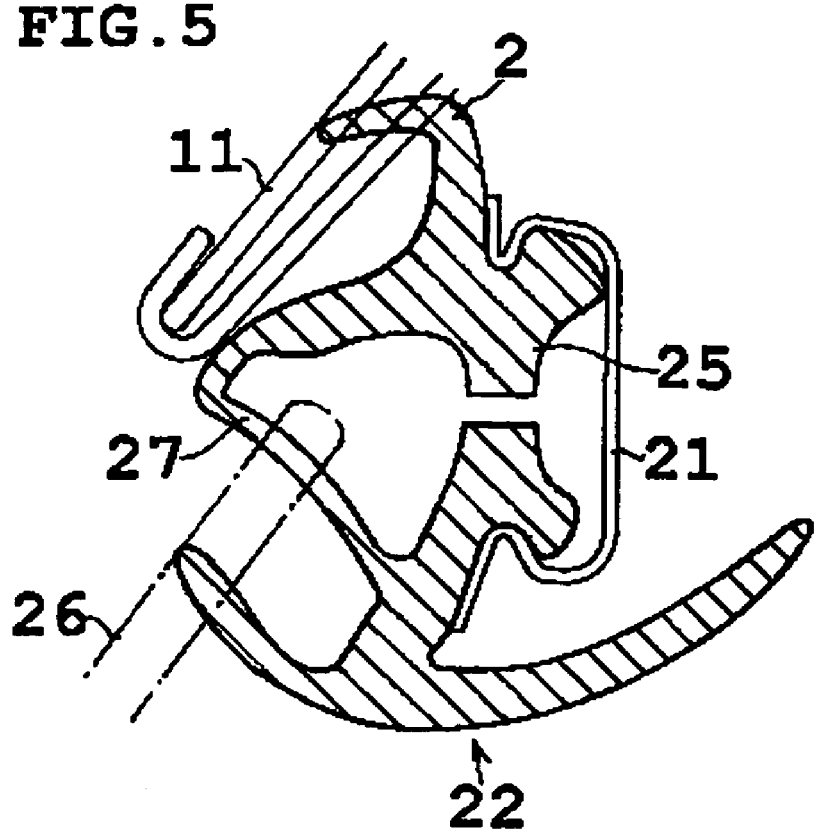
FIG. 5 is a sectional view along line C—C in FIG. 4.
Figure 6:
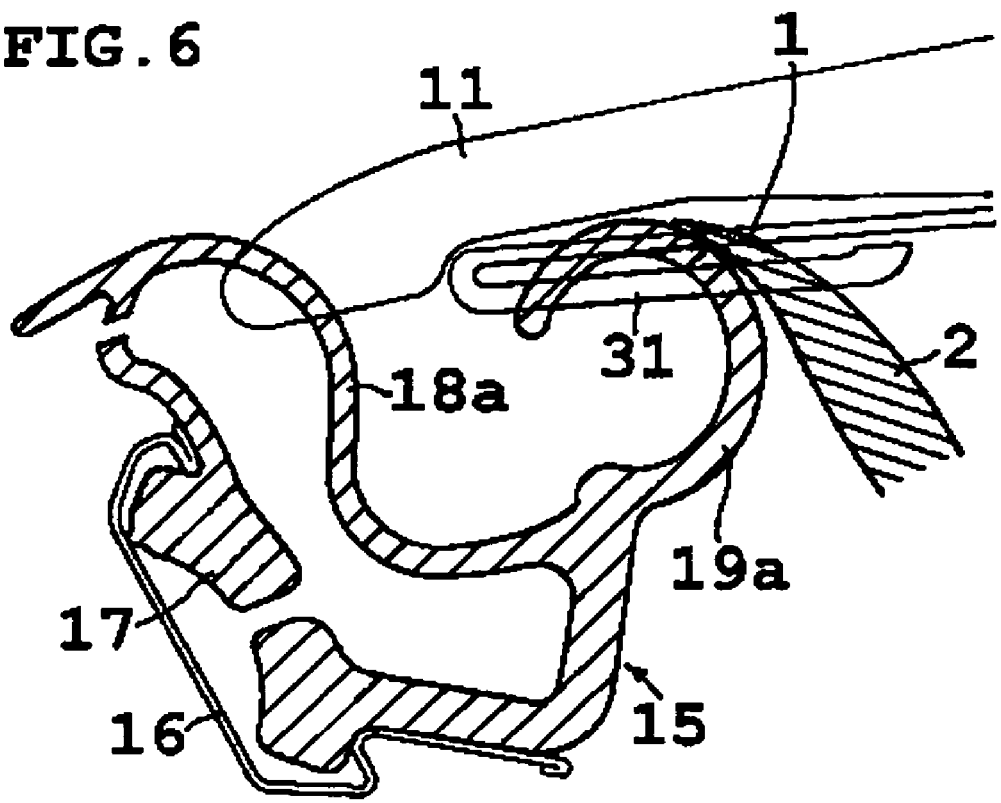
FIG. 6 is a sectional view along line D—D in FIG. 4.

FIGS. 4 and 6 illustrate a second preferred embodiment of the invention wherein a sub-seal portion 28 of a roof side weather strip 22 is formed in a lip shape. This embodiment differs from the previous embodiment shown in FIGS. 1 to 3 in a point that the hollow shape sub-seal portion 28 shown in FIGS. 1 to 3 is formed in a hook shape of a lip 2, and as shown in FIG. 6, a fin shape seal portion 1 is projected from the lip 2.

Figure 7:
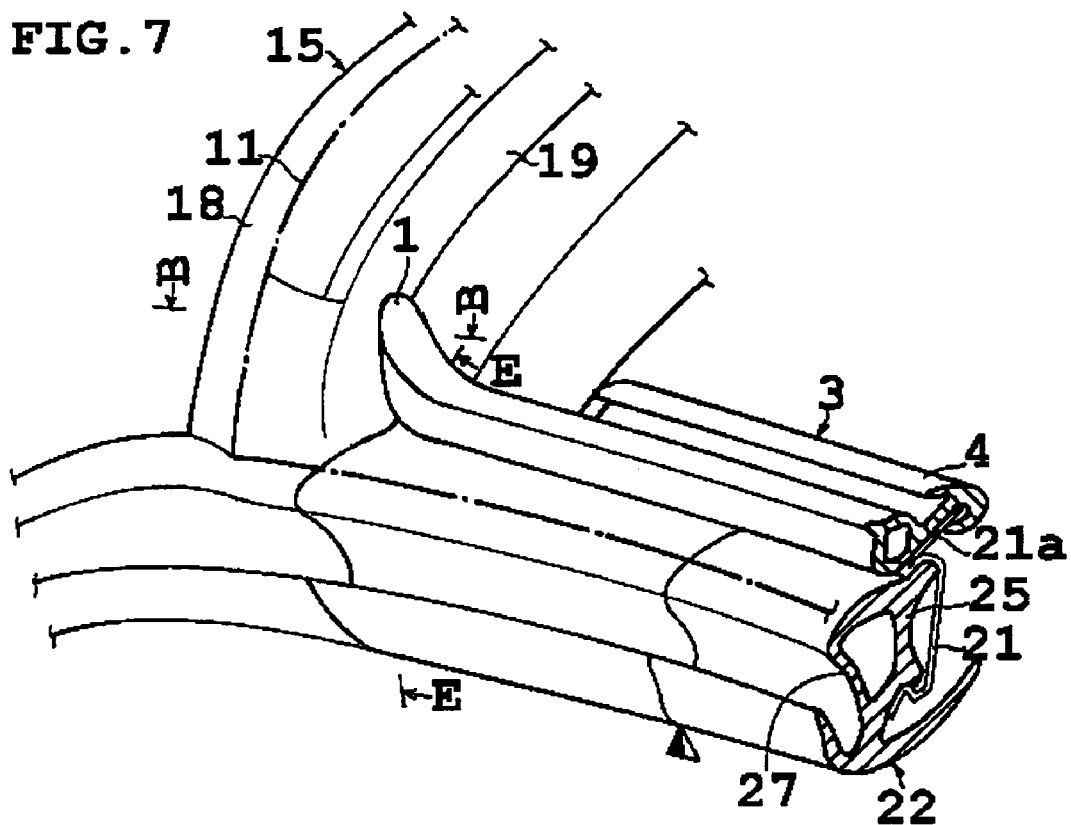
FIG. 7 is a perspective view showing still another embodiment of a sealing structure according to the invention.
Figure 8:
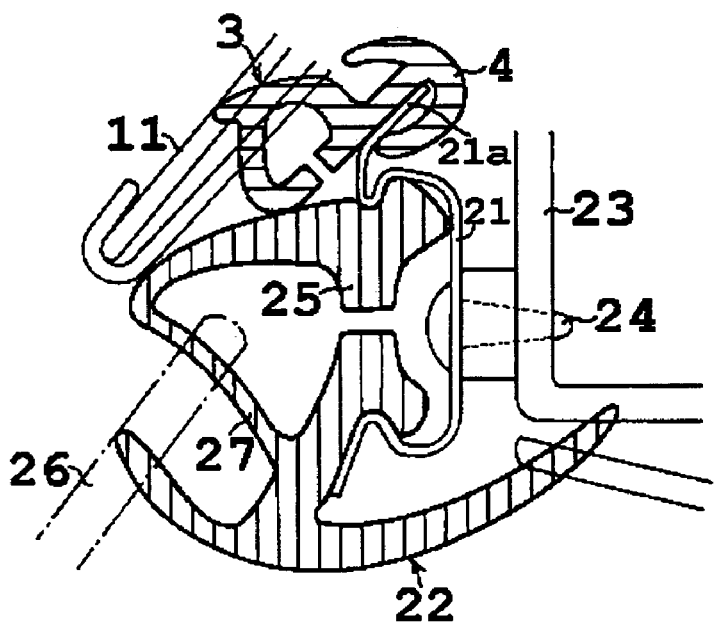
FIG. 8 is a sectional view along line E—E in FIG. 7.
Figure 9:
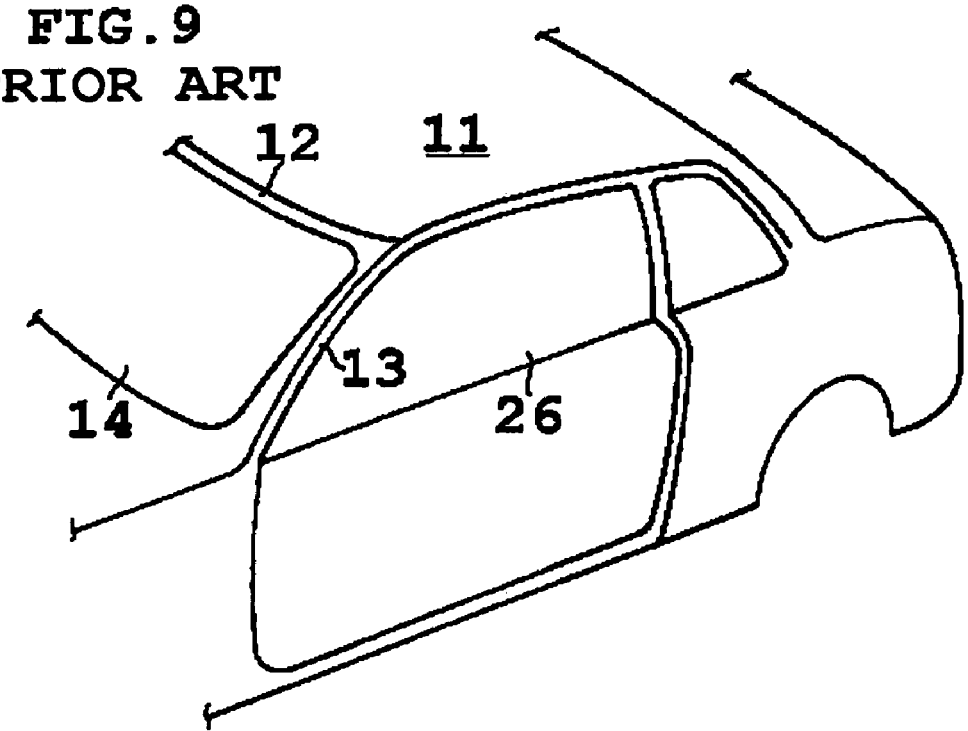
FIG. 9 is a perspective view showing a side of a convertible type vehicle according to the prior art.

FIGS. 7 and 8 illustrate a third preferred embodiment of the invention. This embodiment differs from the embodiment shown in FIGS. 1 to 3 in a point that the sub-seal portion 3 of the roof side weather strip 22 shown in FIGS. 1 to 3 is formed separately from the roof side weather strip 22, and this sub-seal 3 is integrally formed with a mounting portion 4 and is mounted to a flange portion 21a of a retainer 21 by attaching the mounting portion 4 to the flange portion 21a. The fin shape seal portion 1 projects from a front end of the sub-seal portion 3, forming a structure similar to the embodiment shown in FIGS. 1 to 3.

What is claimed is:

1. A sealing structure for a vehicle, wherein the vehicle comprises a roof which opens by being folded or removed, a pair of front pillars and a header that extends between top ends of said front pillars and secures a top end of a front glass, said sealing structure comprising:

a weather strip which is mounted to the header and comprises seal portions to seal between the header and a front end of the roof by making an resilient contact with said front end when said roof is in a closed position;

a roof side weather strip which comprises a seal portion which makes a resilient contact with a side glass of the vehicle when the side glass is in a closed position, and a sub-seal portion mounted on the seal portion to form a seal against said roof by resiliently contacting a side portion of said roof;

wherein said sub-seal portion comprises a fin-shaped seal portion, which bends in an interior side of said vehicle at a front end thereof, and which makes a resilient contact with said weather strip when said roof is in the closed position; and wherein the fin-shaped seal portion has a lower rigidity than at least a portion of the weather strip that is contacted by the fin-shaped seal portion.

2. The sealing structure according to claim 1, wherein the sub-seal portion is shaped as a lip.

* * * * *